United States Patent [19]
Udagawa

[11] Patent Number: 5,642,893
[45] Date of Patent: Jul. 1, 1997

[54] METAL LAMINATE GASKET WITH COATING FLOW PREVENTING DENTS

[75] Inventor: Tsunekazu Udagawa, Ichikawa, Japan

[73] Assignee: Ishikawa Gasket Co., Ltd., Tokyo, Japan

[21] Appl. No.: 584,022

[22] Filed: Jan. 11, 1996

[51] Int. Cl.$^6$ ................................................ F16J 15/08
[52] U.S. Cl. ............................ 277/235 B; 277/235 A
[58] Field of Search ........................... 277/235 A, 235 B

[56] References Cited

U.S. PATENT DOCUMENTS

| | | | |
|---|---|---|---|
| 5,033,189 | 7/1991 | Desverchere et al. | 277/235 B |
| 5,082,298 | 1/1992 | Uchida et al. | 277/235 B |
| 5,122,214 | 6/1992 | Zurfluh et al. | 277/235 A |

FOREIGN PATENT DOCUMENTS

| | | | |
|---|---|---|---|
| 4240661 | 6/1994 | Germany | 277/235 A |

Primary Examiner—William A. Cuchlinski, Jr.
Assistant Examiner—Christina Annick
Attorney, Agent, or Firm—Kanesaka & Takeuchi

[57] ABSTRACT

A metal laminate gasket of the invention is used for an internal combustion engine. The gasket includes a main portion formed of at least two outer metal plates extending substantially throughout an entire area of the engine, a device for defining a first hole corresponding to a hole of the engine, and a coating applied onto a part of the defining device and one of the outer surfaces of the metal plates. The defining device are attached to the outer metal plates and has a plurality of dents near the first hole to surround the same. The coating is filled in the dents to cover a substantial area of the outer surface. Therefore, the coating does not substantially flow to thereby improve sealing around the first hole.

9 Claims, 2 Drawing Sheets

METAL LAMINATE GASKET WITH COATING FLOW PREVENTING DENTS

BACKGROUND OF THE INVENTION AND RELATED ART STATEMENT

The present invention relates to a metal laminate gasket having coating flow preventing dents around a hole, especially a cylinder bore of an internal combustion engine.

In an internal combustion engine having a cylinder head and a cylinder block, the cylinder head and the cylinder block are formed by molding. After molding the cylinder head and the cylinder block, since a gasket is installed between the cylinder head and the cylinder block, the surfaces contacting the gasket are finished or smoothed by a cutter.

Due to the finishing by the cutter, however, small dents or projections are formed on the surfaces of the cylinder head and the cylinder block. Although the dents or projections are small, such dents or projections affect sealing ability of the gasket. Therefore, a gasket is generally provided with coatings on the outer surfaces contacting the cylinder head and the cylinder block. The coatings fill the dents when the gasket is installed, and securely seal between the cylinder head and the cylinder block around the cylinder bore.

However, since the coating is weak against high temperature and pressure, the coating near the cylinder bore of the engine may flow as the gasket is used. As a result, a surface pressure around the cylinder bore reduces, so that the sealing ability around the cylinder bore is gradually impaired.

Accordingly, one object of the invention is to provide a metal laminate gasket, which can securely seal around a cylinder bore without causing flow of a coating formed on the gasket.

Another object of the invention is to provide a metal laminate gasket as stated above, wherein means to prevent flow of the coating can be easily formed on the gasket.

A further object of the invention is to provide a metal laminate gasket as stated above, wherein the means to prevent flow of the coating can be used for a desired metal gasket.

Further objects and advantages of the invention will be apparent from the following description of the invention.

SUMMARY OF THE INVENTION

A metal laminate gasket of the invention is used for an internal combustion engine. The gasket is formed of a main portion, means for defining a first hole corresponding to a hole of the engine, and a coating applied on the main portion and a part of the defining means.

In particular, the main portion is formed of at least two outer metal plates extending substantially throughout an entire area of the engine and piled one on the other. Each outer metal plate has one outer surface facing one of engine parts. The defining means is formed integrally with or separately from the outer metal plates. In any situation, the defining means has a plurality of dents near the first hole to surround the same.

The coating applied onto the main portion and the defining means may be a rubber or resin. When the coating is applied onto the gasket, the coating is filled in the dents and covers a substantial area of the outer surface. Since the coating is filled in the dents, the coating does not substantially flow to thereby improve sealing ability around the first hole.

Namely, if the coating is simply applied onto the outer surface of the gasket, since high temperature and high pressure are applied onto the coating around the first hole or cylinder bore, the coating gradually flows in the direction away from the cylinder bore. However, in the invention, since the coating is filled in the dents near the cylinder bore, the coating located on the outer surface is prevented from moving or flowing by the coating filled in the dents. Therefore, the coating is properly retained on the outer surface of the gasket, so that the sealing ability is maintained for a long time.

Preferably, the dents are formed on both sides of the defining means near the first hole. The coating are filled in the dents on both sides to cover the both sides of the outer surfaces.

The defining means may be integrally formed with one of the outer metal plates and include a base portion, a curved portion extending from the base portion to define the first hole, and a flange extending from the curved portion to be partly located on the outer surface of the other outer metal plate. The dents are formed on the base portion and the flange.

The defining means may be a grommet having a curved portion to define the first hole and two flanges situated on the outer plates. In this case, the dents are formed on the flanges. Alternately, the defining means may be integrally formed with the outer metal plates. In this case, each metal plate has the first hole and the dents near the first hole.

DETAILED DESCRIPTION OF PREFERRED EMBODIMENTS

Figure 1:
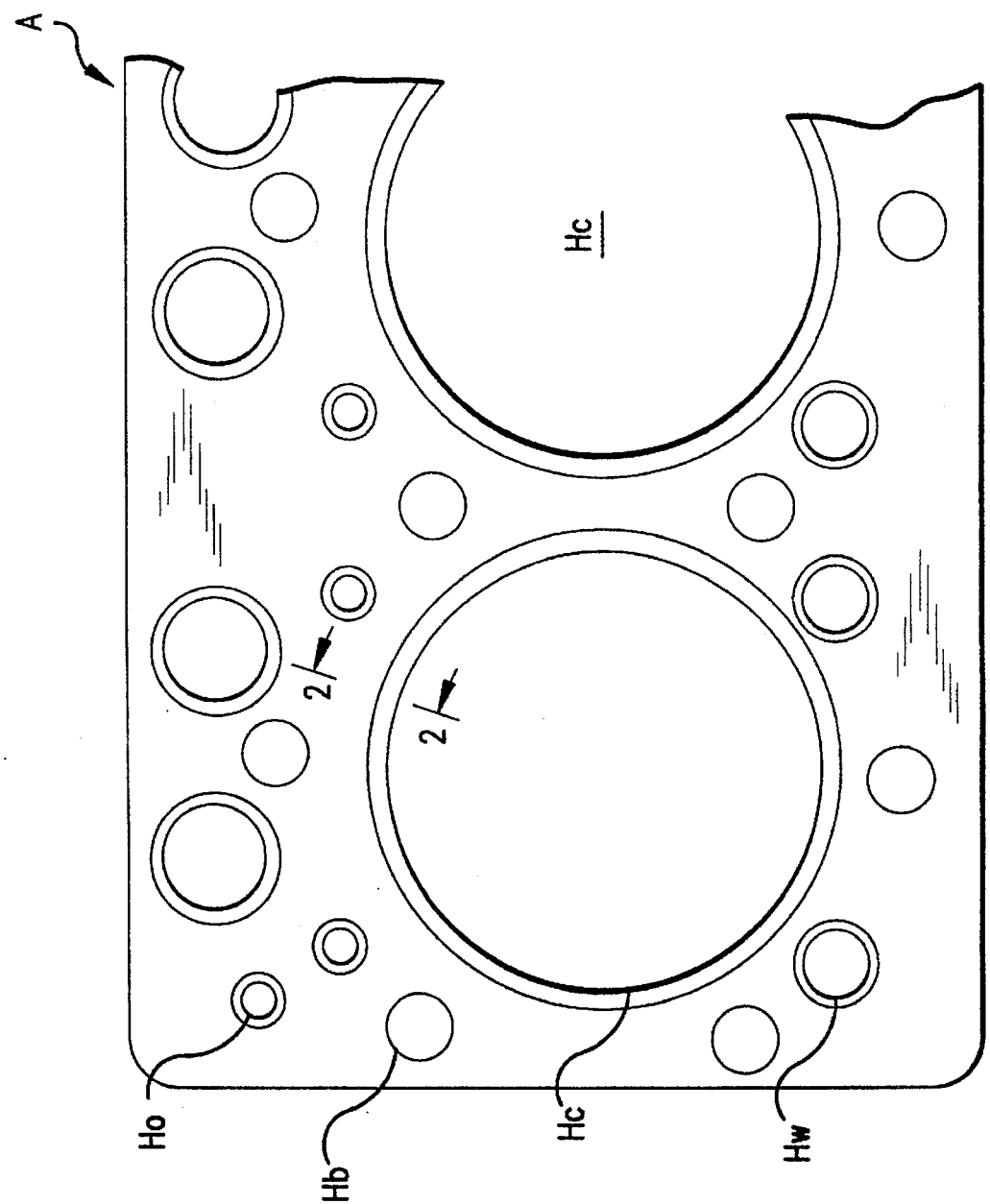
FIG. 1 is a plan view of a part of a first embodiment of a cylinder head gasket of the invention.
Figure 2:
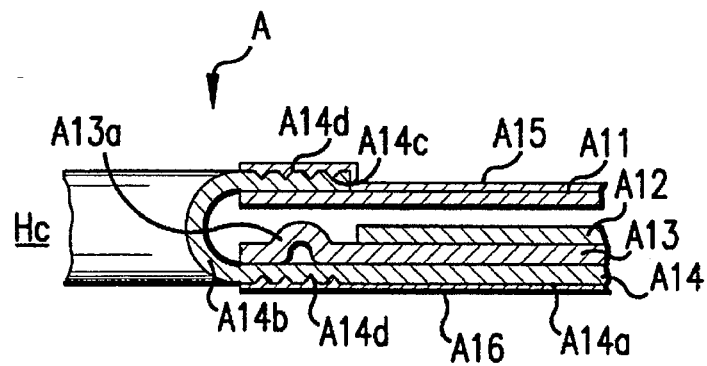
FIG. 2 is an enlarged section view taken along line 2—2 in FIG. 1.

Referring to FIGS. 1 and 2, a first embodiment A of a metal laminate gasket of the invention is shown. The gasket A is a cylinder head gasket, and includes a plurality of cylinder bores Hc, water holes Hw, oil holes Ho, bolt holes Hb and so on, as in the conventional gasket.

The gasket A is formed of an upper plate A11, two middle plates A12, A13, and a lower plate A14. The plates A11–A14 extend substantially throughout the entire area of the engine parts to be sealed. Two coatings A15, A16 are applied onto the outer surfaces of the upper and lower plates A11, A14. In FIG. 1, however, the coating A15 is omitted.

The upper plate A11 has a hole for the cylinder bore Hc. The middle plate A12 is located under the upper plate A11 and has a hole for the cylinder bore Hc. The hole of the middle plate A12 is larger than the hole of the upper plate A11. The middle plate A13 is located under the middle plate A12, and has a hole for the cylinder bore corresponding to the hole of the upper plate A11 and a bead A13a for sealing around the cylinder bore Hc. The bead A13a is located inside the hole of the middle plate A12 and directly abuts against the upper plate A11.

The lower plate A14 includes a base portion A14a situated under the middle plate A13, a curved portion A14b to define the cylinder bore Hc, and a flange A14c disposed on the upper plate A11. The base portion A14a and the flange A14c have a plurality of dents A14d, respectively, to surround the cylinder bore Hc. The dents A14d are preferably formed by coining processing.

In the gasket A, the plates A11–A13 and the plate A14 with the dents A14d are separately formed and then assembled together. Then, the coatings A15, A16 are applied onto the entire outer areas of the upper and lower plates A11, A14 except for the curved portion A14b for the cylinder bore Hc. The coatings are filled in the dents A14d. The coatings A15, A16 may be rubber or resin used in the conventional gasket.

When the gasket A is situated between a cylinder head and a cylinder block (both not shown) and is tightened, the bead A13a is compressed to provide a surface pressure around the cylinder bore for sealing. Also, small dents or scratches formed on the cylinder head and the cylinder block are filled with coatings.

When the engine is operated, high pressure and high temperature are applied to the gasket, especially the portion around the cylinder bore Hc. Since the parts of the coatings are filled in the dents A14d, the coatings A15, A16 do not substantially flow. Therefore, the surface pressure around the cylinder bore is not reduced. The gasket can securely seal around the cylinder bore.

Figure 3:
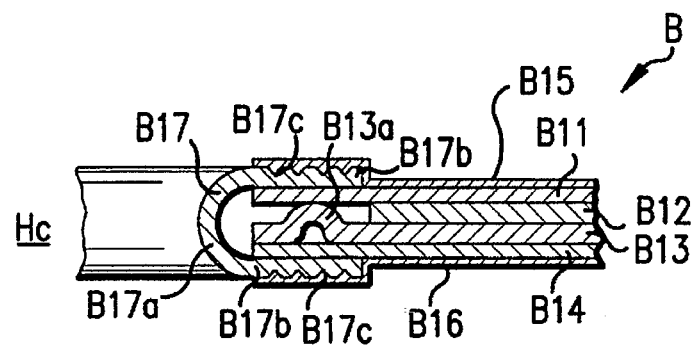
FIG. 3 is a section view, similar to FIG. 2, of a second embodiment of the invention.

FIG. 3 is a second embodiment B of a cylinder head gasket of the invention. The gasket B is formed of an upper plate B11, a middle plate B12, a middle plate B13 with a bead B13a, and a lower plate B14, similar to the gasket A. In the gasket B, however, the lower plate does not have a curved portion, and instead, a grommet B17 is used to define the cylinder bore Hc.

The grommet B17 includes a curved portion B17a and two flanges B17b located outside the upper plate B11 and the lower plate B14. The flanges B17b are provided with a plurality of dents B17c around the cylinder bore Hc. Coatings B15, B16 are applied onto the flanges B17b, the upper plate B11 and the lower plate B14, and the dents B17c are filled with the coatings B15, B16.

In the gasket B, since the coatings B15, B16 are filled in the dents B17c, the coatings B15, B16 do not substantially flow when high temperature and high pressure are applied to the coatings. The gasket B can securely seal around the cylinder bore Hc.

Figure 4:
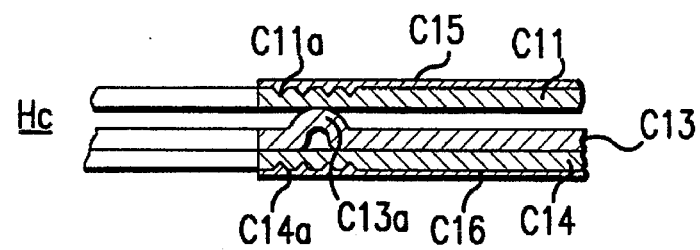
FIG. 4 is a section view, similar to FIG. 2, of a third embodiment of the invention.

FIG. 4 shows a third embodiment C of a cylinder head gasket of the invention. The gasket C is formed of an upper plate C11, a middle plate C13 with a bead C13a, and a lower plate C14, similar to the gasket A. In the gasket C, however, there is no curved portion or grommet surrounding a cylinder bore Hc, and the plates C11, C13 and C14 directly define the cylinder bore Hc.

In the gasket C, the upper plate C11 and the lower plates C14 include a plurality of dents C11a, C14a, respectively, around the cylinder bore Hc. Coatings C15, C16 are formed on the upper plate C11 and the lower plate C14 to fill the dents C11a, C14a.

In the gasket C, since the coatings C15, C16 are filled in the dents C11a, C14a, the coatings C15, C16 do not substantially flow when high temperature and high pressure are applied to the coatings. The gasket C can securely seal around the cylinder bore Hc. Since the structure around the cylinder bore Hc in the gasket C is simple, such structure can be easily applied to other holes, such as water holes Hw and oil holes Ho.

In the present invention, the dents are formed on the plates around the hole to be sealed, and the coatings are applied onto the outer plates and the dents. Since the coatings are filled in the dents, the coatings do not substantially flow. Therefore, the sealing ability is improved.

While the invention has been explained with reference to the specific embodiments of the invention, the explanation is illustrative and the invention is limited only by the appended claims.

What is claimed is:

1. A metal laminate gasket for an internal combustion engine, said engine having engine parts and a hole to be sealed, comprising:

a main portion formed of at least two outer metal plates extending substantially throughout an entire area of the engine and piled one on the other, each outer metal plate having one outer surface facing one of the engine parts, means for defining a first hole corresponding to the hole of the engine, said defining means being formed of a metal plate attached to the outer metal plates, said defining means having a flat inner surface portion facing inwardly of the gasket, an outer surface portion facing outwardly of the gasket, and a plurality of dents formed in the outer surface portion near the first hole to surround the same, said dents extending from the outer surface portion toward the flat inner surface portion without deforming the flat inner surface portion, and a coating applied onto the dents of the defining means and one of the outer surfaces of the metal plates, said coating being filled in the dents and covering a substantial area of the outer surface so that the coating does not substantially flow to thereby improve sealing around the first hole.

2. A metal laminate gasket according to claim 1, wherein said dents are formed on two sides of the defining means near the first hole where the outer surfaces are located, said coating being filled in the dents on both sides and covering both sides of the outer surfaces.

3. A metal laminate gasket according to claim 2, wherein said defining means is integrally formed with one of the outer metal plates and includes a base portion, a curved portion extending from the base portion to define the first hole, and a flange extending from the curved portion and being partly located on the outer surface of the other outer metal plate, said dents being formed on the base portion and the flange.

4. A metal laminate gasket according to claim 3, wherein each of the base portion and the flange includes said flat inner surface portion and said outer surface portion.

5. A metal laminate gasket according to claim 2, wherein said defining means is a grommet having a curved portion to define the first hole and two flanges situated on the outer plates, said dents being formed on the flanges.

6. A metal laminate gasket according to claim 2, wherein said defining means is integrally formed with the outer metal plates, each metal plate having the first hole and the dents near the first hole.

7. A metal laminate gasket according to claim 6, further comprising a middle plate situated between the outer metal plates and having a bead, said bead being located between the dents of the outer metal plates to provide surface pressure when the gasket is tightened.

8. A metal laminate gasket according to claim 1, further comprising means for providing high surface pressure around the first hole, said dents being situated at a portion where high surface pressure from the means for providing high surface pressure is applied when the gasket is tightened.

9. A metal laminate gasket according to claim 8, wherein said means for providing high surface pressure is a bead.

* * * * *